Aug. 21, 1956  U. S. DUNN  2,760,145
ARC WELDING TRANSFORMER APPARATUS
Filed May 21, 1953  3 Sheets-Sheet 1
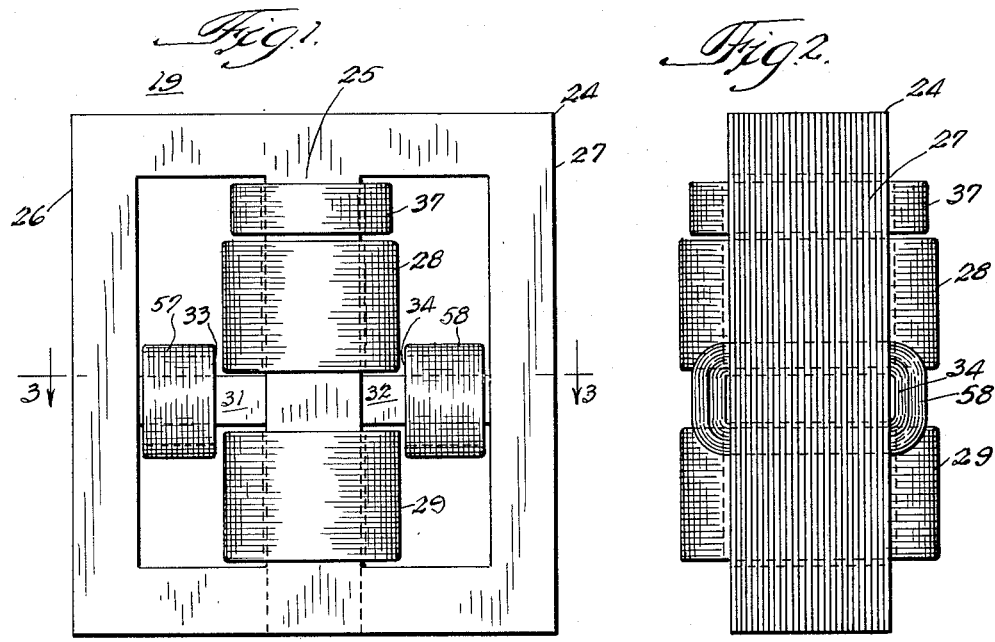
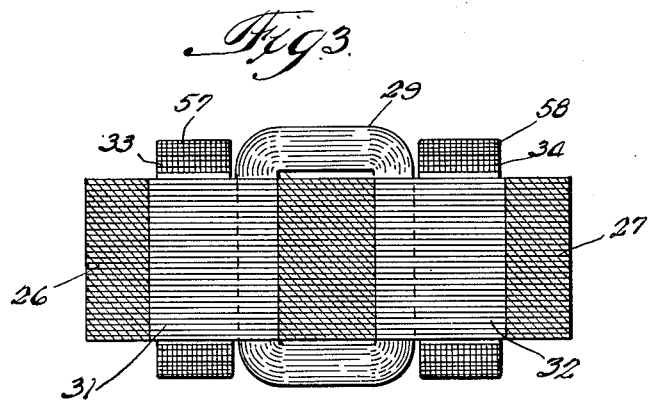
INVENTOR.
Ulysses S. Dunn
BY
Thiess, Olsen, Mecklenburger,
von Holst, & Coltman. Attys Aug. 21, 1956  U. S. DUNN  2,760,145
ARC WELDING TRANSFORMER APPARATUS
Filed May 21, 1953  3 Sheets-Sheet 2

INVENTOR.
Ulysses S. Dunn.
BY
Thiess, Olsen, Mecklenburger,
von Holst, & Coltman. Attys.

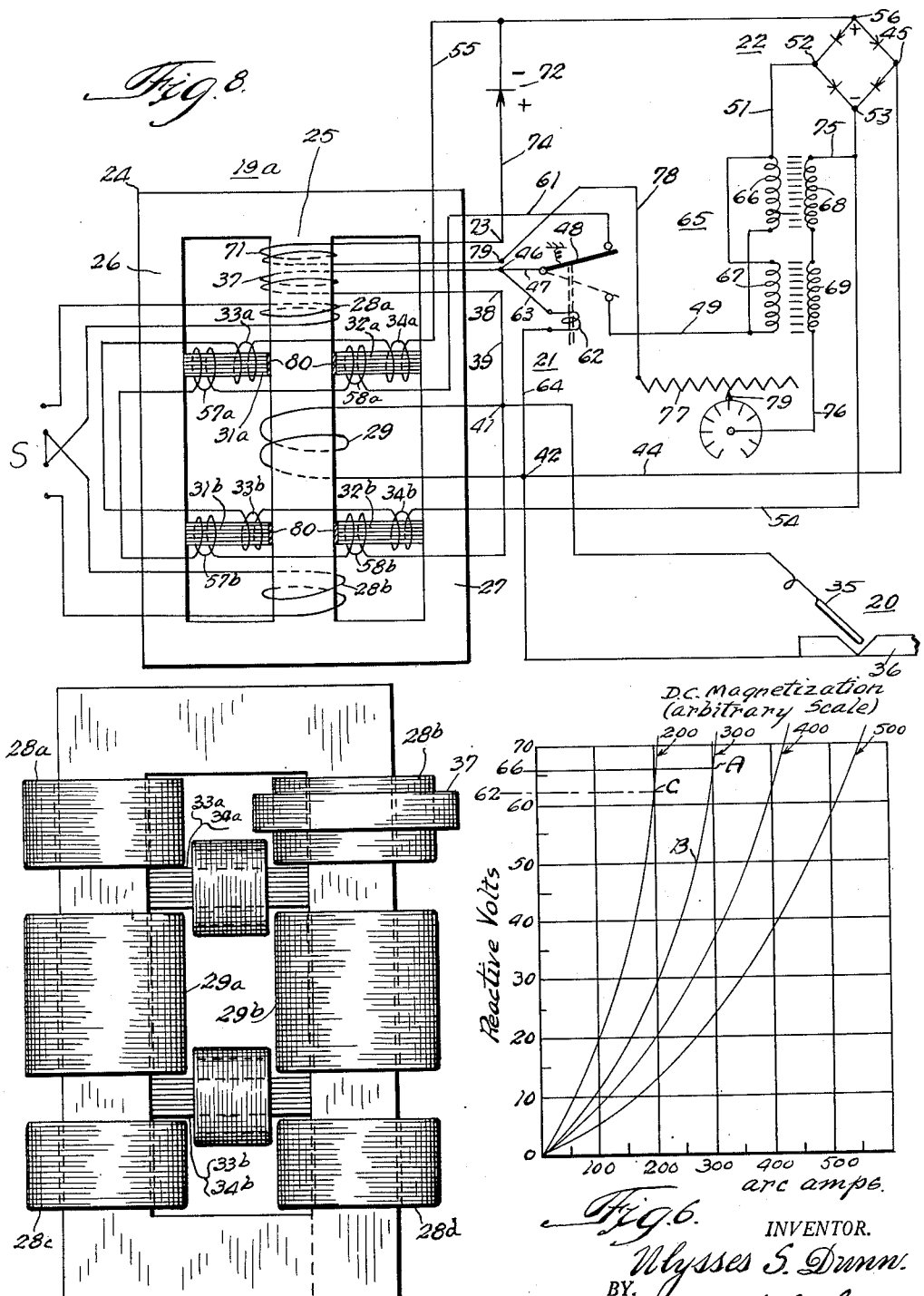

United States Patent Office 2,760,145
Patented Aug. 21, 1956

2,760,145

ARC WELDING TRANSFORMER APPARATUS

Ulysses S. Dunn, Chicago, Ill.

Application May 21, 1953, Serial No. 356,435

19 Claims. (Cl. 323—60)

This invention relates to arc welding transformer apparatus and more particularly to variable output arc welding transformer apparatus including a magnetic shunt type transformer and it is an object of the invention to provide improved apparatus of this character.

Arc welding transformer apparatus in one of its simplest forms may comprise a high leakage reactance transformer consisting of an iron core having a primary winding and a secondary winding disposed thereon and a magnetic shunt placed between the windings for providing the high leakage reactance. Such a transformer may be designed to deliver a maximum current determined by short circuit and may satisfactorily provide suitable welding current in the vicinity of, but less than, the short circuit current value. The maximum current which such a transformer can deliver is determined by the leakage reactance provided by the shunt and it is known to the prior art that the transformer output may be increased by reducing the amount of leakage reactance. This is accomplished according to one prior suggestion by passing direct current through a suitable winding on the shunt to saturate it, thereby decreasing the A. C. leakage flux and consequently increasing the available output current of the transformer. Such prior art suggestions have not proved satisfactory largely because the arcs produced by such devices were unstable. That is, the arcs would tend to go out upon slight waverings of the welding operator's hand. Accordingly, it is a further object of the invention to provide improved arc welding transformer apparatus of the character indicated which provides stable arc characteristics, particularly a high value of reignition voltage and a substantial elimination of the zero dwell of arc current.

According to one form of the invention there is provided, in an electric arc welding method utilizing a transformer having a shunt, the step of feeding back to windings on such shunt a voltage varying inversely with the arc voltage whereby improved arc stability during welding and safety during non-welding or open circuit condition are obtained.

It is a further object of the invention to provide improved arc welding transformer apparatus of the character indicated in which the variable output can be continuously controlled between suitable minimum and maximum values at a point remote from the apparatus itself, for example at the work, while retaining stable arc characteristics.

It is a further object of this invention to provide improved arc welding transformer apparatus of the character indicated wherein the no-load secondary voltage of the transformer is automatically reduced to a safe value when the apparatus is excited and the operator is not welding.

It is a further object of the invention to provide improved arc welding transformer apparatus of the charcater indicated which is compact in form and economical to construct.

Further objects of the invention will become apparent as the description proceeds.

For a more complete understanding of the invention reference should be had to the accompanying drawings, in which:

Figure 1 is a front elevational view of an arc welding transformer according to the invention;

Fig. 2 is a side elevational view of the transformer shown in Fig. 1;

Fig. 3 is a sectional view of the transformer shown in Fig. 1 taken substantially in the direction of arrows 3—3;

Fig. 6 is a graph of a family of curves useful in explaining operation of the apparatus according to the invention;

Fig. 8 is a circuit diagram of a further form of arc welding transformer apparatus according to the invention;

Fig. 9 is a front elevational view of a further form of arc welding transformer according to the invention.

Figure 4:
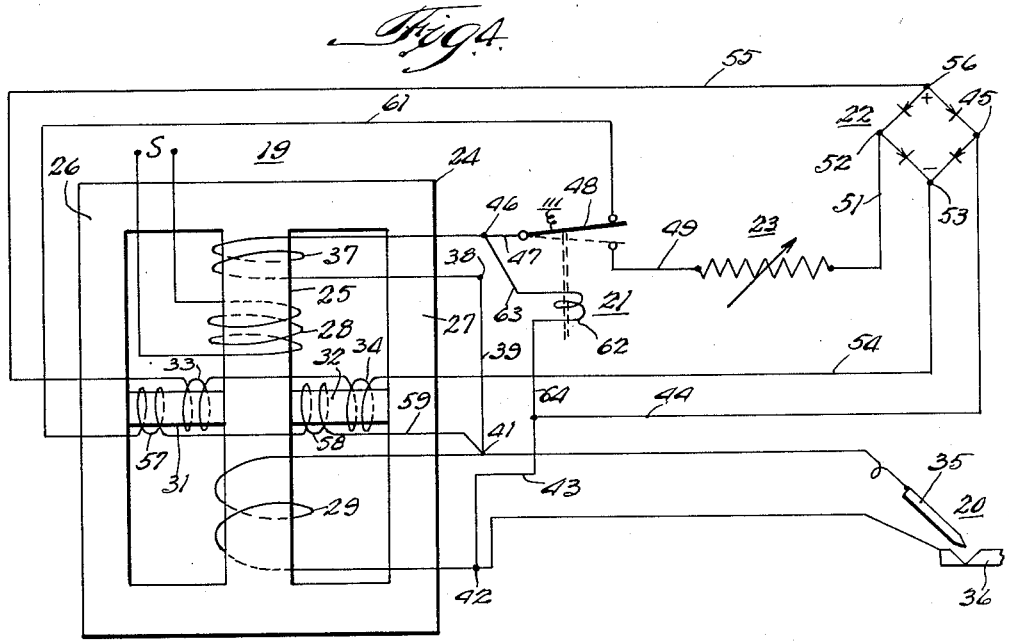
Fig. 4 is a circuit diagram of arc welding transformer apparatus according to the invention.

Referring to the drawings, the invention is shown in Figs. 1, 2, 3 and 4 as comprising a transformer 19 for supplying welding current to the work 20, a relay 21, a rectifier 22 and a rheostat 23 being provided for control purposes, as will be more fully described.

The transformer 19 is of the shell type, for example, having a core 24 including a central leg 25 and outer legs 26 and 27 and primary and secondary windings 28 and 29 respectively disposed upon the central leg 25. Disposed between the primary winding 28 and the secondary winding 29 are magnetic shunts 31 and 32, and disposed on the shunts 31 and 32 are windings 33 and 34 respectively through which a direct current is to be passed for welding current control purposes.

The core 24 is formed of laminations of suitable transformer steel, a sufficient thickness of stack being chosen concomitantly with the size of the lamination to provide a core of the correct size for the rating of welding transformer desired. The numbers of turns in the primary and secondary windings are chosen to give the desired rating of welding transformer, the ratio of the turns being such that on open circuit of the transformer a practical secondary voltage of about seventy volts is obtained. The width of the outer legs 26 and 27 of the core together are, of course, equal to the width of the central leg 25 and preferably may be somewhat larger.

The shunt members 31 and 32 may be formed of stacks of laminations lying flatwise in the same planes as the main laminations. In such case, the shunts with a cross-sectional area selected according to well understood principles may extend with metal to metal contact between the respective sides of the central leg 25 and the outer legs 26 and 27. With the laminations of the shunt members disposed as described, it is not essential that an air or other nonmagnetic gap be provided between the shunt members and the contiguous portions of the core, although such a gap may be provided if found desirable.

The characteristics of windings 33 and 34 are selected as is well understood to enable the welding current to be controlled throughout the range desired, it being necessary for these windings to provide a somewhat greater number of D. C. ampere turns than the A. C. ampere turn rating of the secondary winding, for example. The direction of the turns and the connections of the coils 33 and 34 are such that they are additive with respect to the D. C. flux produced in the shunts and the alternating voltages induced into the coils 33 and 34 by the alternating fluxes cancel each other.

Referring to Fig. 4 and bearing the foregoing description of structure in mind, with the assumptions that no D. C. magnetization is applied and that the safety feature of the invention to be described is not functioning, it will be apparent that when a voltage source S of suitable magnitude and frequency, for example 230 volts, 60 cycles per second, is connected to the primary winding 28, a voltage will be induced into winding 29 which will approximate seventy volts as a practical matter under no load or open circuit conditions. Some of the primary flux is, of course, diverted through the shunts 31 and 32 but the no-load secondary may represent about ninety per cent of the theoretical turns ratio value. When the welding electrode 35 is shorted to the workpiece 36 to be welded, a large short circuit current flows in winding 29 and through the welding electrode, and when the electrode is lifted from the work to strike the arc, the current provided by winding 29 drops to the proper value and the welding proceeds. The current in secondary winding 29 produces a counter flux opposing the primary flux, thereby causing an increased percentage of the flux to be diverted through the shunts 31 and 32. The diversion of flux, that is to say, the leakage reactance causes the secondary voltage to drop from its open circuit value of about seventy volts to a practical welding value of about thirty volts. The condition as thus far described represents that of a minimum welding current since the maximum amount of flux is being diverted through the shunts 31 and 32, this representing perhaps a forty ampere current in a two hundred ampere welder.

The output current of the welder may be increased by passing direct current through the shunt windings 33 and 34 thereby saturating the shunts to a greater or lesser extent. As the direct current through the windings 33 and 34 is increased, the current which the welder will deliver to a weld is increased since the coupling between the primary and secondary windings 28 and 29 is improved, as is well understood.

The direct current supplied to windings 33 and 34 is provided through a full wave rectifier 22 and the amount of the current is controlled inversely in proportion to the voltage existing across the welding arc, that is the voltage existing across the secondary winding 29. The manner of effecting this may be described as follows: A winding 37 is provided on the central core leg 25 closely adjacent to the primary winding 28 and a sufficient number of turns may be chosen for this winding to provide an open circuit voltage equal to that of the secondary winding, that is, about seventy volts, for example. The winding 37 is closely disposed to the primary winding 28 so as to deliver virtually a constant voltage irrespective of the load being provided by the secondary winding 29.

The voltage of winding 37 is bucked against that of winding 29 and the difference voltage is applied to the input of rectifier 22 when welding is being carried on, the circuit being traceable as follows: From terminal 38 of winding 37, through conductor 39 to terminal 41 of winding 29, through winding 29 to terminal 42 thereof, and through conductors 43 and 44 to one input terminal 45 of rectifier 22, and from the other terminal 46 of winding 37 through conductor 47, arm 48 of relay 21 (in dotted position), conductor 49, rheostat 23 and conductor 51 to the other input terminal 52 of the rectifier. The direct current output of the rectifier is supplied to windings 33 and 34 through a circuit which may be traced as follows: From output terminal 53 of the rectifier, through conductor 54, windings 34 and 33 and conductor 55 to the other output terminal 56 of the rectifier. With the relay arm 48 in the position shown dotted, the windings 33 and 34 will receive a direct current proportional to the difference of the voltages of the windings 37 and 29.

The percentage desired of the voltage difference between windings 27 and 39 to give the desired range of welding current is determined by the setting of rheostat 23, this determining the voltage which is applied to terminals 45 and 52. For the minimum setting of welding current, the rheostat 23 is set to its value of largest resistance, thereby to provide the smallest value of alternating voltage to the terminals 45 and 52, and vice versa. Consequently, when the smallest amount of direct current is supplied to windings 33 and 34 with resultant low saturation of the shunts, there is a greater amount of leakage flux permitted and a correspondingly reduced value of secondary voltage and arc current. When welding is commenced by putting the welding rod 35 into contact with the workpiece 36, the voltage of winding 29 at terminals 41 and 42 drops to zero by virtue of the short circuit. Hence, the voltage of winding 37, namely about seventy volts, is applied to the input of the rectifier through the circuit described and the direct current determined by the setting of rheostat 23 (the current being a maximum for this setting since the secondary winding 29 is short circuited) is delivered to the windings 33 and 34. Prior to putting the electrode 35 into contact with the workpiece 36, the direct current applied to windings 33 and 34 is zero since the difference between the voltages of windings 29 and 37 is zero, thereby permitting the maximum amount of leakage flux to be in shunts 31 and 32. This maximum leakage flux would permit a minimum of current to flow at the instant of beginning a weld.

The direct current in the shunt members 31 and 32 saturates them to a certain extent, thereby permitting the current delivered by the winding 29 to the shorted electrode to increase rapidly to a larger value. Then when the electrode 35 is lifted off the workpiece 36 to initiate the arc, there is a large current present to insure a good arc. The operator draws the arc to the desired length and proceeds to weld, the size of the welding electrode having previously been selected to conform to the current to be delivered by the welder for the particular setting of the rheostat 23.

If it is desired to supply a larger welding current, the rheostat 23 is set to a lower value of resistance, the particular setting having been predetermined, an appropriate electrode 35 is selected and the procedure already described is followed. By virtue of the reduced resistance setting of rheostat 23, a larger amount of direct current flows through windings 33 and 34, thereby saturating the shunt members 31 and 32 to a greater extent and thus enabling a larger current to be delivered by winding 29 by virtue of the improved coupling between winding 29 and the primary winding 28.

For any setting of rheostat 23 there is a range of current varying from the short circuit value which is the largest to that when the arc is struck and continuing to that when the arc goes out when the arc has been unduly lengthened, the latter current being the smallest. Between striking the arc and extinguishing it, there is a proper welding range.

The constant voltage winding 37 may be a source of voltage separate from the transformer 19. The number of turns in winding 37 may be less than that described and a portion of winding 29 only be used in obtaining the control voltage.

It has been found that, while the range of welding current to be delivered to a weld may be satisfactorily controlled by providing a predetermined value of direct current to appropriately disposed shunts for each particular range of current desired and the wave shape of the welding current is satisfactory in that the arc does not tend to go out when the welding current passes through zero, the arc tends to be unstable with respect to small waverings of the hand of the operator. That is to say, it has become critical that the spacing of the end of the welding electrode with respect to the workpiece be maintained as accurately as possible. This is difficult to do inasmuch as it is virtually inevitable that the hand of the operator will waver slightly as the electrode is moved across the workpiece during deposition of the welding material. This condition is obviated according to the present invention by controlling the amount of direct current to windings 33 and 34 inversely in accordance with the voltage across the arc, which is to say, the voltage of the secondary winding across terminals 41 and 42. In this manner, the D. C. magnetization applied to the shunt members 31 and 32 and to the core legs 26 and 27 is varied inversely according to the arc voltage.

A stable welding arc is obtained with apparatus wherein the ratio of inductive reactance to arc resistance is high, for example, in a high leakage reactance transformer with no D. C. magnetization present. By virtue of the high reactance to resistance ratio, the voltage drop across the arc and the induced voltage into the secondary winding of the transformer are out of phase by large angles, for example, sixty degrees to seventy degrees. This also is true of circuits having large values of reactance external to the transformer. With such a large phase difference, the reignition voltage, should the arc go out as the current decreases toward zero, is large and the arc reignites with a very small, if any, zero dwell. That is, the interval during which the arc current is zero is reduced to a negligible value. In such an arrangement, as the arc voltage is increased by lengthening the arc during welding, the phase angle between the arc voltage and the induced voltage becomes less, and when the length of the arc is increased to a point at which the phase angle is about fifty degrees, the reignition voltage is sufficiently small so that if the arc is lengthened any more, there is insufficient reignition voltage and the arc goes out at the point of zero current.

The reignition voltage would be increased if the inductive reactance were increased as the arc voltage is increased. Consequently, the arc would be stable over a larger range of arc lengthening.

When a D. C. magnetization is applied to the shunts 31 and 32, such as for welding current range control, and the shunts become more or less saturated, the amount of leakage reactance associated with the secondary winding 29 is reduced. Consequently, the ratio of inductive reactance of the secondary winding 29 to the resistance of the arc is reduced, thereby reducing the phase angle and the reignition voltage as already described, and small waverings of the hand of the operator may cause the arc to be lengthened beyond its critical value and the arc goes out. This disadvantage exists, even though applying the D. C. magnetization has enabled the operator to increase the current range of the welding transformer so that heavier work, for example, could be done.

According to the invention, stability of the arc is maintained while the control facilitating D. C. magnetization is present. As the hand of the operator wavers and the length of the arc is increased slightly, the voltage across the arc, that is across terminals 41 and 42, is increased and the difference between this voltage and the voltage of winding 37 is decreased, the decreased voltage after rectification being applied in a certain percentage to the windings 33 and 34. This decrease in D. C. voltage to these windings effects a momentary decrease in the D. C. magnetization, thereby increasing the ratio of the inductive reactance in the welding current circuit (of winding 29 in the present circuit) to the resistance of the arc with consequent increase in the available reignition voltage as described and thus the arc does not go out.

Figure 5:
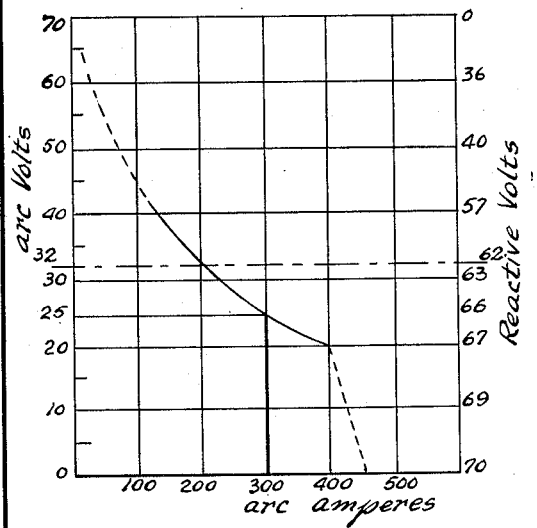
Fig. 5 is a graph of an arc characteristic useful in explaining operation of the invention.

The foregoing may also be understood by considering Figs. 5 and 6. In Fig. 5 there is shown a curve representing the volt-ampere characteristic of a typical arc. As may be seen from this graph, the usable arc may extend from about twenty volts at four hundred amperes to about forty volts at one hundred thirty amperes, a typical operating arc being indicated by the heavy lines at twenty-five volts and three hundred amperes. If the arc is shortened to less than about twenty volts, the arc is shorted by droplets of metal and the voltage decreases to zero as shown by the dotted line. As the arc is lengthened, at some point between forty and fifty volts, the arc becomes unstable and goes out due to the lack of reignition voltage.

At the right-hand side of Fig. 5, there is shown a scale of reactive volts which is computed according to well known principles, bearing in mind that the reactive voltage and the arc voltage are ninety degrees out of phase with each other. In Fig. 6 there is shown a family of curves of D. C. magnetization on coordinate axes of arc amperes and reactive volts, the reactive volts of this graph being the same reactive volts although with a uniform scale as shown in Fig. 5. The D. C. magnetization is shown on an arbitrary scale corresponding to specific values of arc amperes, it being understood that the D. C. magnetization in ampere turns bears a well known relationship to the A. C. ampere turns of the secondary winding. Considering that a typical arc may be three hundred amperes at twenty-five volts (Fig. 5), this operating point may be seen as point A in Fig. 6 showing that at three hundred arc amperes there is a reactive voltage in the circuit of sixty-six volts and a D. C. magnetization of three hundred. If the D. C. magnetization remains constant at three hundred and the arc is lengthened slightly to decrease the arc current to about two hundred seventy amperes, in Fig. 6, this would move the operating point down the three hundred D. C. magnetization curve to fifty volts reactive at point B. The decrease from three hundred amperes to two hundred seventy amperes is small, but it has resulted in a decrease in reactive voltage from sixty-six volts to fifty volts. In Fig. 5 it may be seen that a reactive voltage of fifty volts corresponds to slightly less than fifty arc volts and is at the point of arc instability. According to the invention, as the arc voltage tends to increase, the D. C. magnetization does not remain constant but is decreased. In a typical instance, it is assumed that the arc is lengthened to cause a decrease from three hundred amperes to two hundred amperes. This, of course, would cause the arc to go out immediately except for the invention. The amount of D. C. magnetization applied to the core by the windings 37 and 29 and the rectifier 22, all properly chosen, and with the rheostat 23 set at the three hundred arc ampere point, the D. C. magnetization becomes that represented by the two hundred curve of Fig. 6. That is, the new operating point is point C for which the reactive voltage is sixty-two volts. On Fig. 5 this may be seen to correspond to thirty-two arc volts which is well within the limits of the arc voltages. Accordingly, the arc is stable and does not go out.

This process may be continued for further lengthenings of the arc and in an actual case the arc could be lengthened until the arc current is less than one hundred amperes, thereby giving the operator a large degree of leeway in his random hand waverings without having the arc extinguished.

The rheostat 23 may be calibrated so that the operator may predetermine the minimum welding current intended to be used. For example, there may be positions corresponding to arc amperes of one hundred to five hundred in one hundred ampere steps. The self-regulating action already described occurs for each of these settings.

An economical, simple and effective self-regulating welding transformer accordingly has been provided.

In the foregoing description, it has been assumed that the arm 48 of relay 22 is in its dotted position. If the arm always remained in this position, the open circuit voltage of the secondary winding 29 would appear at the welding electrode whenever the welder is excited and the arc is broken. This voltage, being of the order of seventy volts, is dangerous to the operator and this condition is obviated through the operation of relay 21 and certain additional windings by reducing the secondary voltage to a low value whenever the arc is broken, but without hindering the starting of welding current whenever the welding electrode is touched to the workpiece.

On shunts 31 and 32 there are disposed windings 57 and 58 respectively wound to provide an A. C. flux which bucks the transformer flux, thereby to reduce the secondary voltage when the arc is not operating. The excitation for windings 57 and 58 is provided from auxiliary winding 37 through a circuit which may be traced as follows: From terminal 38 of winding 37, through conductor 39 to terminal 41, conductor 59 through windings 58 and 57, conductor 61, arm 48 in its solid line position, and conductor 47 to the other terminal 46 of winding 37. Thus, whenever the arm 48 is in its solid line position, the windings 57 and 58 receive a current which effects bucking down of the voltage of winding 29 as indicated.

The arm 48 of relay 22 is biased, for example such as by a spring to occupy the solid line position shown, and a coil 62 is provided for moving the arm into the dotted position when needed. The coil 62 is energized according to the difference of voltages of windings 37 and 29 through a circuit which may be traced as follows: From terminal 46 of winding 37, through conductor 63, coil 62, conductor 64, conductor 43, terminal 42, winding 29, terminal 41, conductor 39, terminal 38 and through winding 37 to terminal 46. The voltage across terminals 42 and 46 is zero when the arc is out and the welder is excited. Under this condition, the coil 62 is unenergized and the relay arm 48 occupies its solid line position with consequent application of the voltage of winding 37 to the windings 57 and 58 and a reduction of the voltage of winding 29. The windings 57 and 58 may be so chosen that the secondary voltage is reduced to any safe value, for example to forty volts. The difference between forty volts of winding 29 and seventy volts of winding 37 is, of course, applied to coil 62, but this difference voltage of thirty volts is insufficient to cause coil 62 to move arm 48 from its solid line position. When the operator touches the welding rod 35 to the workpiece 36, the voltage across terminals 41 and 42 momentarily drops to zero, whereby the voltage applied to coil 62 becomes seventy volts. This is sufficient to cause the arm 48 to move quickly into its dotted line position with consequent application of direct current to the windings 33 and 34 as already described, and welding may commence.

While the voltage at welding electrode 35 is less than the seventy volts open circuit when the welding electrode is first touched to the workpiece, this is of no detriment, because when relay arm 48 moves to its dotted line position, direct current is suddenly applied to windings 33 and 34, thereby reducing the reactance of the secondary winding as already described and permitting the alternating current flow through the shorted welding electrode to increase very rapidly. But since the voltage at the electrode is small in the first instance, the current at this same first instance is small with the consequence that the welding electrode does not stick to the work, and after a short interval the welding electrode may be lifted from the work to start the arc with the current therein having increased to a value above that which it would have had if no D. C. magnetization had been applied. As the arc is drawn a voltage appears across terminals 41 and 42 which of course, reduces the voltage applied to coil 62, but the difference between a normal arc voltage of twenty to forty volts, for example, and the seventy volts of coil 37 is still sufficient for the relay to continue to hold arm 38 in the dotted line position. Thus the operator may permit the arc to increase in length through ordinary wavering without having the relay 21 drop out.

However, when the arc is extinguished and the voltage across terminals 41 and 42 increases to the open circuit value, at some point along the voltage change, for example, at fifty volts, the relay coil 62 has insufficient voltage applied to it and allows the arm 48 to move from the dotted line position to the solid line position whereby the windings 57 and 58 become energized and the voltage of winding 29 is reduced to a low or safe value.

The utilization of this safety system does not hinder the operation of the welder, but actually enhances it since it enables the welding electrode to be touched to the workpiece without sticking and yet it permits the welding current to increase rapidly so that the welding operation is not hindered.

Functions of the arc voltage are fed back during welding and during open circuit, according to the invention, to windings 33 and 34 for arc stability and to windings 57 and 58 for safety reasons.

The rheostat 23 is necessarily bulky, if of sufficient size to handle the necessary control amperes. It could not, for example, be attached to the electrode holder or carried in the operator's hand. The control element may be reduced in size by the construction and arrangement illustrated in Fig. 8 and taken in connection with Fig. 7. In Fig. 8 a saturable reactor control unit 65 supplants the rheostat 23 shown in Fig. 4. In so far as control of the welding current range is concerned, this is the principal difference between the disclosures of Figs. 4 and 8 and the corresponding Figs. 1 and 7.

Figure 7:
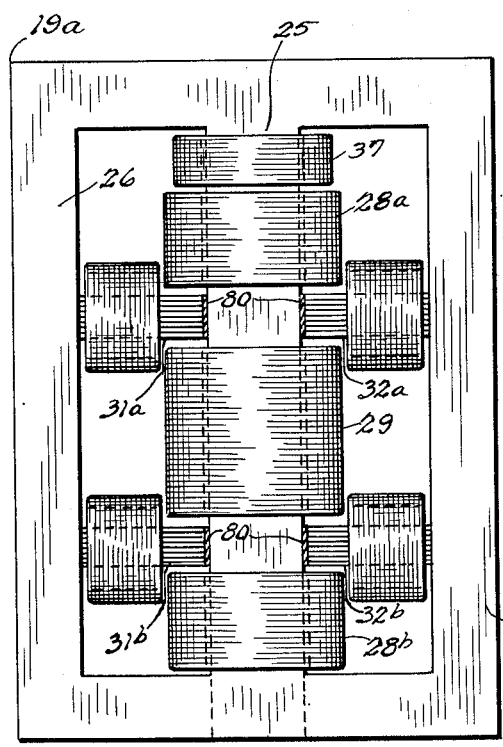
Fig. 7 is a front elevational view of a modified form of arc welding transformer according to the invention.

The transformer construction proper 19a of Figs. 7 and 8 differs from that of Figs. 1 and 4 mainly in that the transformer of Figs. 7 and 8 is provided with a primary winding having two sections 28a and 28b spaced between which there is a single secondary winding 29. To complete the structural arrangement, two shunts are provided in the transformer of Figs. 7 and 8, one between each section of the primary winding and the secondary winding, the shunts being designated by the reference characters 31a and 31b and 32a and 32b, in order to correspond to the shunt members having the same function in the structure of Fig. 1. The windings 33 and 34 of Fig. 4 become windings 33a, 33b, 34a and 34b in Fig. 8, and the windings 57 and 58 of Fig. 4 become the windings 57a, 57b, 58a and 58b of Fig. 8. The remaining elements of the circuit as shown in Fig. 8 and of the transformer shown in Fig. 7 which correspond in function to those of the circuit shown in Fig. 4 and of the transformer shown in Fig. 1, have been given the same reference characters as those in Figs. 4 and 1. The functions of the elements so numbered are the same and the transformer operates the same. Consequently the description of the overall function is not repeated.

The saturable reactor of control unit 65 of Fig. 8 takes its A. C. input through the arm 48 of relay 21 (dotted position) from winding 37 and through conductor 49 as described in connection with Fig. 4, the output of the control unit being provided through conductor 51 to the terminal 52 of rectifier unit 22. The alternating voltage applied to terminals 52 and 45 of rectifier 22 is taken across terminals 42 and 46 of the secondary winding 39 and winding 37 as described in connection with Fig. 4, and the alternating current flowing through terminals 52 and 45 of the rectifier is the same as that described in connection with Fig. 4. Control of this alternating current, which flows through windings 66 and 67 of the saturable reactor unit, is effected by means of direct current flowing in the windings 68 and 69 of the saturable reactor unit. The windings 66 and 67 in parallel are wound on a common core with windings 68 and 69, the windings 66 and 67 having a predetermined reactance, which reactance may be varied by varying the direct current in windings 68 and 69. In this manner, the amount of alternating current which the windings 37 and 29 can supply to the rectifier 22 and thus the direct current to the shunt saturating windings 33a, 33b and 34a and 34b is readily controlled.

In order to have stability in the control circuit, the direct current necessary for saturating the core of the saturable reactor unit 65 is not taken entirely from the D. C. output of rectifier unit 22 which is a feedback current, but is provided in part from an independent source or non-feedback. Thus, a winding 71 is provided on the central leg of the transformer core and derives a voltage which is rectified in a rectifier 72 and is applied to the windings 68 and 69 through a circuit which may be traced as follows: From terminal 73 of winding 71 through conductor 74, rectifier 72, conductor 55, through rectifier 22 at terminals 56 and 53, through conductor 75, windings 68 and 69, conductor 76, a portion of resistor 77, and conductor 78 to the other terminal 79 of winding 71. Of course, the direct voltage appearing across terminals 53 and 56 of rectifier 23 derived from windings 37 and 29 also is imposed on the windings 68 and 69 through the circuit just described. It is currents due to both voltages passing through windings 68 and 69 which determine the condition of saturation of unit 65 and thereby the alternating current supplied to the rectifier and ultimately the amount of direct current supplying the D. C. magnetization of the transformer shunts. As a practical matter about seventy-five per cent of the direct current through the control unit may be feedback and twenty-five per cent may be non-feedback.

By virtue of the saturable reactor unit 65, the alternating current supplied to the rectifier unit 23 may be controlled with a very small direct current flowing through the resistor 77. This small direct current is controllable by a movable contact 79 which, together with the resistor 77, forms a small rheostat which may be attached to the welding electrode holder.

The particular setting of the movable contact 79 may be made according to graduations on a control knob, which graduations will indicate the current setting or range of the welder itself.

The divided primary of the transformer of Fig. 7 is one expedient which may be resorted to when it is desired to increase the rating of the welder. Also in Fig. 7, the shunt members are shown laminated at right angles to the planes of the core laminations. It is necessary, then, to have a non-magnetic gap 80 at the end of the shunt at which it abuts the central leg 25. Shunts of the same character as shown in Figs. 1 and 4 may, of course, be used.

The invention described in detail in connection with the preceding figures and with particular reference to the transformer structure of Figs. 1, 2, 3 and 7, has equal application to other transformer structures as may now be described, and others as well.

In Fig. 9 there is shown a further modification, i. e., a core-type transformer in which the primary winding is divided into four parts 28a, 28b, 28c and 28d, the secondary winding is divided into two parts 29a and 29b, all for the purpose of increasing the output rating of the welding transformer as may be desired and as is well understood in this art. A shunt member 33a, 34a is provided between the parts 28a and 28b of the primary winding and one side of the secondary winding parts 29a and 29b and a shunt member 33b, 34b is also provided between the parts 28c and 28d and the other side of the secondary winding parts 29a and 29b. Appropriate windings are disposed on these shunt members and an auxiliary winding 37, corresponding to the winding of the same reference character in the preceding figures, is disposed around the primary winding part 28b.

The function of the various windings in Fig. 9 will be clear from a consideration of the description in connection with Figs. 1 and 4.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. In arc welding transformer apparatus including a transformer having a core, a primary winding and a secondary winding for delivering regulated alternating current suitable for welding, means including a relatively constant source of voltage and said secondary winding connected in opposition thereto for controlling the application to a portion of said core of a D. C. magnetization varying inversely according to the voltage of said secondary winding for controlling the welding current delivered thereby.

2. In arc welding transformer apparatus including a transformer having a core, a primary winding and a secondary winding for delivering regulated alternating current suitable for welding, means including a winding closely coupled to said primary winding, said secondary winding connected in voltage opposition to said closely coupled winding, and a rectifier energized by said secondary winding and said closely coupled winding, said means controlling the application to a portion of said core of a D. C. magnetization varying inversely according to the voltage of said secondary winding for controlling the welding current delivered thereby.

3. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, and means including a relatively constant source of voltage and said secondary winding connected in opposition thereto for controlling the application to said magnetic shunt of a D. C. magnetization varying inversely according to the voltage of said secondary winding.

4. In arc welding transformer apparatus including a transformer having a core, a primary winding, a secondary winding for delivering regulated alternating current suitable for welding and a magnetic shunt magnetically disposed between said windings, means for controlling the welding current delivered by said secondary winding comprising a winding closely coupled to said primary winding and connected in voltage opposition to said secondary winding, and a rectifier energized by said secondary winding and said closely coupled winding, said means controlling the application to said magnetic shunt of a D. C. magnetization varying inversely according to the voltage of said secondary winding.

5. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, a winding closely coupled to said primary winding having a voltage substantially equal to the open circuit voltage of said secondary winding and connected in voltage opposition to said secondary winding, and a rectifier energized by said secondary winding and said closely coupled winding, said means controlling the application to said magnetic shunt of a D. C. magnetization varying inversely according to the voltage of said secondary winding.

6. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, a winding closely coupled to said primary winding having a voltage substantially equal to the open circuit voltage of said secondary winding and connected in voltage opposition to said secondary winding, and a rectifier energized by said secondary winding and said closely coupled winding, said means controlling the application to said magnetic shunt of a D. C. magnetization varying inversely according to the voltage of said secondary winding, control means in the circuit of said secondary winding, closely coupled winding and rectifier for predetermining the limits of welding current delivered by said secondary winding.

7. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, a winding closely coupled to said primary winding having a voltage substantially equal to the open circuit voltage of said secondary winding and connected in voltage opposition to said secondary winding, and a rectifier energized by said secondary winding and said closely coupled winding, said means controlling the application to said magnetic shunt of a D. C. magnetization varying inversely according to the voltage of said secondary winding, resistance means in the circuit of said secondary winding, closely coupled winding and rectifier for predetermining the limits of welding current delivered by said secondary winding.

8. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, a winding closely coupled to said primary winding having a voltage substantially equal to the open circuit voltage of said secondary winding and connected in voltage opposition to said secondary winding, and a rectifier energized by said secondary winding and said closely coupled winding, said means controlling the application to said magnetic shunt of a D. C. magnetization varying inversely according to the voltage of said secondary winding, saturable reactor means in the circuit of said secondary winding, closely coupled winding and rectifier for predetermining the limits of welding current delivered by said secondary winding.

9. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, a winding on said magnetic shunt, a rectifier for supplying direct current to said shunt winding, a winding closely coupled to said primary winding having a voltage substantially equal to the open circuit voltage of said secondary winding and connected in voltage opposition to said secondary winding, said secondary winding and said closely coupled opposition connected winding being connected to the input of said rectifier whereby the direct current supplied to said shunt winding varies in inverse relationship according to the voltage of said secondary winding for controlling the welding current delivered thereby.

10. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, a winding closely coupled to said primary winding having a voltage substantially equal to the open circuit voltage of said secondary winding and connected in voltage opposition to said secondary winding, and a rectifier energized by said secondary winding and said closely coupled winding, said means controlling the application to said magnetic shunt of a D. C. magnetization varying inversely according to the voltage of said secondary winding, a winding on said magnetic shunt so wound and connected to said closely coupled winding as to cause a flux in said shunt bucking down the voltage of said secondary winding, and a relay responsive to the voltage of said secondary winding and said closely coupled opposition connected winding for disconnecting said shunt winding from said closely coupled winding when said secondary winding is delivering welding current and closing the circuit between said shunt winding and said closely coupled winding when said secondary winding is open circuited.

11. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, a first winding on said magnetic shunt, a rectifier for supplying direct current to said first winding, a winding closely coupled to said primary winding having a voltage substantially equal to the open circuit voltage of said secondary winding and connected in voltage opposition to said secondary winding, said secondary winding and said closely coupled opposition connected winding being connected to the input of said rectifier whereby the direct current supplied to said first winding varies in inverse relationship according to the voltage of said secondary winding for controlling the welding current delivered thereby, a second winding on said magnetic shunt connected to said closely coupled winding to generate a flux in said core bucking down the flux generated by said primary winding to reduce the voltage of said secondary winding, and a relay responsive to the voltage of said secondary winding and said closely coupled opposition connected winding for disconnecting said second winding from said closely coupled winding when said secondary winding is delivering welding current and at the same time closing the input circuit to said rectifier and closing the circuit between said second winding and said closely coupled opposition connected winding when said secondary winding is open circuited and at the same time opening the input circuit to said rectifier.

12. In arc welding transformer apparatus including a transformer having a core, a primary winding and a secondary winding for delivering regulated alternating current suitable for welding, means for reducing the open circuit voltage of the secondary winding to a safe value comprising a winding closely coupled to said primary winding and connected in voltage opposition to said secondary winding, a winding on said magnetic shunt connected to said closely coupled winding to generate a flux in said core bucking down the flux generated by said primary winding to reduce the voltage of said secondary winding, and a relay responsive to the voltage of said secondary winding and said closely coupled opposition connected winding for disconnecting said shunt winding from said closely coupled winding when said secondary winding is delivering welding current and closing the circuit between said shunt winding and said closely coupled winding when said secondary winding is open circuited.

13. In arc welding transformer apparatus including a transformer having a core, a primary winding and a secondary winding for delivering regulated alternating current suitable for welding, means providing reactance in said transformer for controlling the welding current delivered by said secondary winding, and means for varying said reactance in direct relationship with the arc voltage during welding.

14. In arc welding transformer apparatus including a transformer having a core, a primary winding and a secondary winding for delivering regulated alternating current suitable for welding, means for providing reactance in said transformer, direct current means for controlling said reactance whereby the welding current delivered by said secondary winding may be controlled, and means for varying the effect of said direct current means inversely in accordance with the arc voltage during welding.

15. In an electric arc welding method the steps of applying an alternating supply voltage to the primary winding on a transformer core to create a flux, deflecting a portion of the flux through a shunt of the core, transforming a major portion of the flux into welding voltage and, at least under predetermined welding voltage conditions, feeding a voltage which is an inverse function of the welding voltage back to a winding on the shunt thereby to modulate such welding voltage.

16. In an electric arc welding method comprising the steps of applying an alternating supply voltage to the primary winding on a transformer core to create a flux, deflecting a portion of the flux through a shunt of the core, transforming a major portion of the flux into a welding voltage and loading the welding voltage by an arc, the arc stabilizing feature of feeding a voltage which is a direct current inverse function of the welding voltage back to a winding on said shunt to variably saturate the shunt and thereby to increase the welding current in response to a lengthening of the arc.

17. In an electric arc welding method comprising the steps of applying an alternating supply voltage to the primary winding on a transformer core to create a flux, deflecting a portion of the flux through a shunt of the core, transforming a major portion of the flux into a welding voltage and alternately loading and opening the welding circuit, the safety feature of feeding a voltage which is an alternating current function of the open circuit welding voltage back to winding on said shunt to create another flux therein so as to buck the first mentioned flux and thereby to reduce the open circuit welding voltage.

18. In arc welding transformer apparatus including a transformer having a core, a primary winding and a secondary winding for delivering regulated alternating current suitable for welding, means providing reactance in the welding circuit for controlling the welding current delivered by said secondary winding, and means for varying said reactance in direct accordance with the arc voltage during welding.

19. In arc welding transformer apparatus including a transformer having a core, a primary winding and a secondary winding for delivering regulated alternating current suitable for welding, means for controlling the welding current delivered by said secondary winding comprising a magnetic shunt magnetically disposed between said primary winding and said secondary winding, a winding closely coupled to said primary winding having a voltage substantially equal to the open circuit voltage of said secondary winding and connected in voltage opposition to said secondary winding, and a rectifier energized by said secondary winding and said closely coupled winding, said means controlling the application to said magnetic shunt of a D. C. magnetization varying inversely according to the voltage of said secondary winding, means for substantially reducing the voltage of said secondary winding, and means for rendering said secondary voltage reducing means effective whenever said secondary winding is open circuited.

References Cited in the file of this patent

UNITED STATES PATENTS

| | | |
|---|---|---|
| 2,245,192 | Gugel | Jan. 10, 1941 |
| 2,500,189 | Landis | Mar. 14, 1950 |
| 2,644,109 | Mulder | June 30, 1953 |